United States Patent
Guo et al.

(10) Patent No.: US 10,628,196 B2
(45) Date of Patent: Apr. 21, 2020

(54) DISTRIBUTED ISCSI TARGET FOR DISTRIBUTED HYPER-CONVERGED STORAGE

(71) Applicant: VMware, Inc., Palo Alto, CA (US)

(72) Inventors: Zhaohui Guo, Shanghai (CN); Zhou Huang, Shanghai (CN); Jian Zhao, Shanghai (CN); Yizheng Chen, Sunnyvale, CA (US); Aditya Kotwal, Mountain View, CA (US); Jin Feng, Shanghai (CN); Christos Karamanolis, Los Gatos, CA (US)

(73) Assignee: VMWARE, INC., Palo Alto, CA (US)

( * ) Notice: Subject to any disclaimer, the term of this patent is extended or adjusted under 35 U.S.C. 154(b) by 106 days.

(21) Appl. No.: 15/350,027

(22) Filed: Nov. 12, 2016

(65) Prior Publication Data
US 2018/0136957 A1    May 17, 2018

(51) Int. Cl.
| | |
|---|---|
| G06F 9/455 | (2018.01) |
| H04L 29/06 | (2006.01) |
| G06F 21/60 | (2013.01) |
| H04L 29/08 | (2006.01) |
| G06F 21/53 | (2013.01) |

(52) U.S. Cl.
CPC ........ *G06F 9/45558* (2013.01); *G06F 21/606* (2013.01); *H04L 63/0428* (2013.01); *H04L 67/1097* (2013.01); *G06F 21/53* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 6,757,753 | B1 * | 6/2004 | DeKoning | G06F 3/0605 710/36 |
| 6,915,354 | B1 * | 7/2005 | Ozdemir | G06F 13/102 70/20 |
| 7,325,097 | B1 * | 1/2008 | Darcy | G06F 3/0622 709/208 |
| 7,460,473 | B1 * | 12/2008 | Kodama | H04L 47/10 370/230 |
| 7,464,222 | B2 * | 12/2008 | Matsunami | G06F 3/0607 707/999.1 |

(Continued)

OTHER PUBLICATIONS

"ISCSI (Internet Small Computer System Interface)", Searchstorage.com searchstorage.techtarget.com/definition/iSCSI, Oct. 20, 2014, 3 pages.

(Continued)

*Primary Examiner* — Abu Zar Ghaffari

(57) ABSTRACT

A given host machine in a virtualization system having a virtual distributed storage system may receive an iSCSI protocol packet from a computer system separate from the given host machine. Processing the iSCSI protocol may include accessing distributed storage device (iSCSI target) comprising storage connected to the two or more host machines in the virtualization system. The given host machine may generate an outbound iSCSI protocol packet comprising return data received from the target and send the outbound iSCSI protocol packet to the computer system.

20 Claims, 14 Drawing Sheets

(56) References Cited

U.S. PATENT DOCUMENTS

| | | | | |
|---|---|---|---|---|
| 7,519,769 B1* | 4/2009 | Kulkarni | ............... | G06F 3/0607 711/114 |
| 7,664,883 B2* | 2/2010 | Craft | ................ | H04L 67/1097 370/463 |
| 7,698,424 B1* | 4/2010 | Clark | ................ | H04L 67/1097 709/213 |
| 7,730,221 B2* | 6/2010 | Diamant | ............... | G06F 9/4416 710/1 |
| 7,843,907 B1* | 11/2010 | Abou-Emara | ...... | H04L 47/6205 370/386 |
| 7,843,931 B1* | 11/2010 | Anker | ................ | H04L 12/1881 370/389 |
| 7,870,317 B2* | 1/2011 | Suresh | ................ | G06F 3/061 710/74 |
| 7,873,700 B2* | 1/2011 | Pawlowski | ........... | G06F 3/0607 707/781 |
| 7,990,994 B1* | 8/2011 | Yeh | ................... | H04L 12/4641 370/431 |
| 7,991,783 B2* | 8/2011 | Flynn, Jr. | ............... | G06F 3/0605 707/759 |
| 8,127,093 B2* | 2/2012 | Asano | .................. | G06F 3/0605 711/161 |
| 8,504,693 B2* | 8/2013 | Khosravi | ................. | G06F 8/60 709/227 |
| 8,863,124 B1* | 10/2014 | Aron | ................... | G06F 9/45533 709/223 |
| 8,976,704 B2* | 3/2015 | Morper | ............... | H04L 41/0853 370/254 |
| 9,116,624 B2* | 8/2015 | Canepa | ................ | G06F 3/0683 |
| 9,830,082 B1* | 11/2017 | Srinivasan | ............. | G06F 3/0608 |
| 9,946,569 B1* | 4/2018 | Beedu | ................ | G06F 9/45558 |
| 2003/0084209 A1* | 5/2003 | Chadalapaka | ........ | G06F 3/0601 710/5 |
| 2003/0115447 A1* | 6/2003 | Pham | ................. | H04L 63/0428 713/153 |
| 2003/0177174 A1* | 9/2003 | Allen | ........................ | G06F 3/06 709/203 |
| 2004/0143640 A1* | 7/2004 | Rangan | ................ | G06F 3/0613 709/212 |
| 2004/0260768 A1* | 12/2004 | Mizuno | .................... | G06F 9/52 709/203 |
| 2005/0091333 A1* | 4/2005 | Kobayashi | ........ | H04L 29/12169 709/212 |
| 2005/0144404 A1* | 6/2005 | Nashimoto | ........... | G06F 3/0607 711/154 |
| 2005/0210144 A1* | 9/2005 | Kumagai | ........... | H04L 67/1008 709/229 |
| 2006/0020664 A1* | 1/2006 | Umeda | ................ | G06F 3/0608 709/203 |
| 2010/0030910 A1* | 2/2010 | Pong | ........................ | H04L 69/08 709/232 |
| 2010/0036932 A1* | 2/2010 | Ogata | .................. | G06F 16/10 709/216 |
| 2010/0161843 A1* | 6/2010 | Spry | ................... | H04L 67/1097 710/22 |
| 2011/0246734 A1* | 10/2011 | Umbehocker | ........ | G06F 3/0608 711/162 |
| 2012/0303810 A1* | 11/2012 | Kotha | ................... | H04L 12/413 709/225 |
| 2013/0007741 A1* | 1/2013 | Britsch | ................. | G06F 9/4401 718/1 |
| 2014/0289463 A1* | 9/2014 | Carl | ....................... | G06F 3/0604 711/114 |
| 2015/0117199 A1* | 4/2015 | Chinnaiah Sankaran | ................. | H04L 47/2433 370/235 |
| 2015/0172104 A1* | 6/2015 | Brandwine | ............. | H04L 69/40 709/224 |
| 2016/0357692 A1* | 12/2016 | Lu | ........................ | G06F 13/4081 |
| 2016/0359955 A1* | 12/2016 | Gill | ..................... | H04L 67/1097 |

OTHER PUBLICATIONS

Jonghoon (Jason) Jeong, "iSCSI SAN Topologies", EMC2 Techbooks, EMC Corporation, emc.com/collateral/hardware/technical-documentation/h8080-iscsi-san-topologies.pdf, Copyright 2011-2015, 192 pages.

"NetApp iSCSI Features/Benefits", NetApp, netapp.com/us/products/protocols/iscsi/features/aspx, Jan. 2106 [retrieved Feb. 1, 2017], 3 pages.

Steven Poitras, "The Nutanix Bible", nutanixbible.com, Copyright 2016, 164 pages.

Scale Computing, "Scale Computing Storage Cluster User Guide", scalecomputing.com/files/documentation/userguide-2.3.3.pdf, Jan. 2016 [retrieved Feb. 1, 2017], 116 pages, San Mateo, CA.

Hans De Leenheer et al, "Deep Dive on SimpliVity's OmniStack", nu.co.za/images/SimpliVity/Whitepapers/omnicube_technical_deep_dive.pdf, Aug. 2013, 10 pages.

Brian Suhr, "Hyper-Converged Infrastructure comparison, Nutanix vs SimpliVity vs EVO:RAIL", datacenterzombie.com, Oct. 2014, 11 pages.

J. Satran et al, "Internet Small Computer Systems Interface (iSCSI)" ieff.org/rfc/rfc3720.txt, Apr. 2004, 222 pages.

George Penokie, Information Technology—SCSI Architecture Model—4 (SAM-4), INCITS, Nov. 21, 2007, 149 pages.

Ralph O. Weber, Information Technology—SCSI Primary Commands—4 (SPC-4), INCITS, Jul. 29, 2008, 740 pages.

Lee Duncan, "A Tutoria on SCSI-3 Persistent Group Reservations", SUSE Labs, Dec. 2012, 11 pages.

Edward Tomasz Napierala, "Native iSCSI target", FreeBSD Handbook, May 17, 2014, 1 page.

Freebsd, "28.12. iSCSI Initiator and Target Configuration", FreeBSD Handbook, Jan. 2016 [retireved Mar. 21, 2017], 5 pages.

Microsoft, "Multipath I/O Overview", Microsoft TechNet, Jun. 2015 [retrieved Mar. 21, 2017], 6 pages.

Jens Axboe, "FIO", Free(code), Jun. 2014, 1 page.

* cited by examiner

DISTRIBUTED ISCSI TARGET FOR DISTRIBUTED HYPER-CONVERGED STORAGE

BACKGROUND

The Small Computer Systems Interface (SCSI) standard has become a widely adopted architecture for use in storage systems. SCSI moves data among computer systems in units called "blocks" to provide high-performance data storage. A limitation of SCSI, however, is the distance between the computer system and the SCSI block-based storage device.

Internet SCSI (iSCSI) is a protocol that uses the transmission control protocol (TCP) to transport SCSI commands, enabling the use of the existing TCP/IP networking infrastructure as a storage area network (SAN). iSCSI presents SCSI targets and devices to iSCSI initiators (servers, requesters). iSCSI makes block devices available via the network. Block devices are presented across an IP network to the computer system. iSCSI can provide the transport of high performance block-based storage data of SCSI devices over a common IP network, and thus removes distance limitations of traditional SCSI.

iSCSI may provide access in a virtualized distributed storage system via a virtual appliance executing as a virtual machine (VM) in a virtualization system. A virtual machine refers to a software-based implementation of a machine in the virtualization system, in which the hardware resources of a physical "bare metal" computer (e.g., CPU, memory, etc.) are virtualized into the underlying support for the virtual machine, which can run its own operating system and applications on the underlying physical resources of the physical computer. A virtualized distributed storage system may comprise the aggregation of physical storage among the physical computers that comprise the virtualization system, which can be allocated as virtual disks that VMs can access. A virtual appliance that executes as a virtual machine in the virtualization system can therefore provide iSCSI services to virtual disks in the virtualization system.

Some challenges present themselves using a virtual appliance for iSCSI I/O. Virtual machines are bound by a scheduler in the hypervisor of the physical machine, which manages the deployment and execution of VMs. The virtual appliance is just another virtual machine, that has to wait its turn in the CPU queue along all the other virtual machines. Accordingly, the virtual appliance may not get enough CPU, potentially impacting turnaround times in processing I/O operations.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
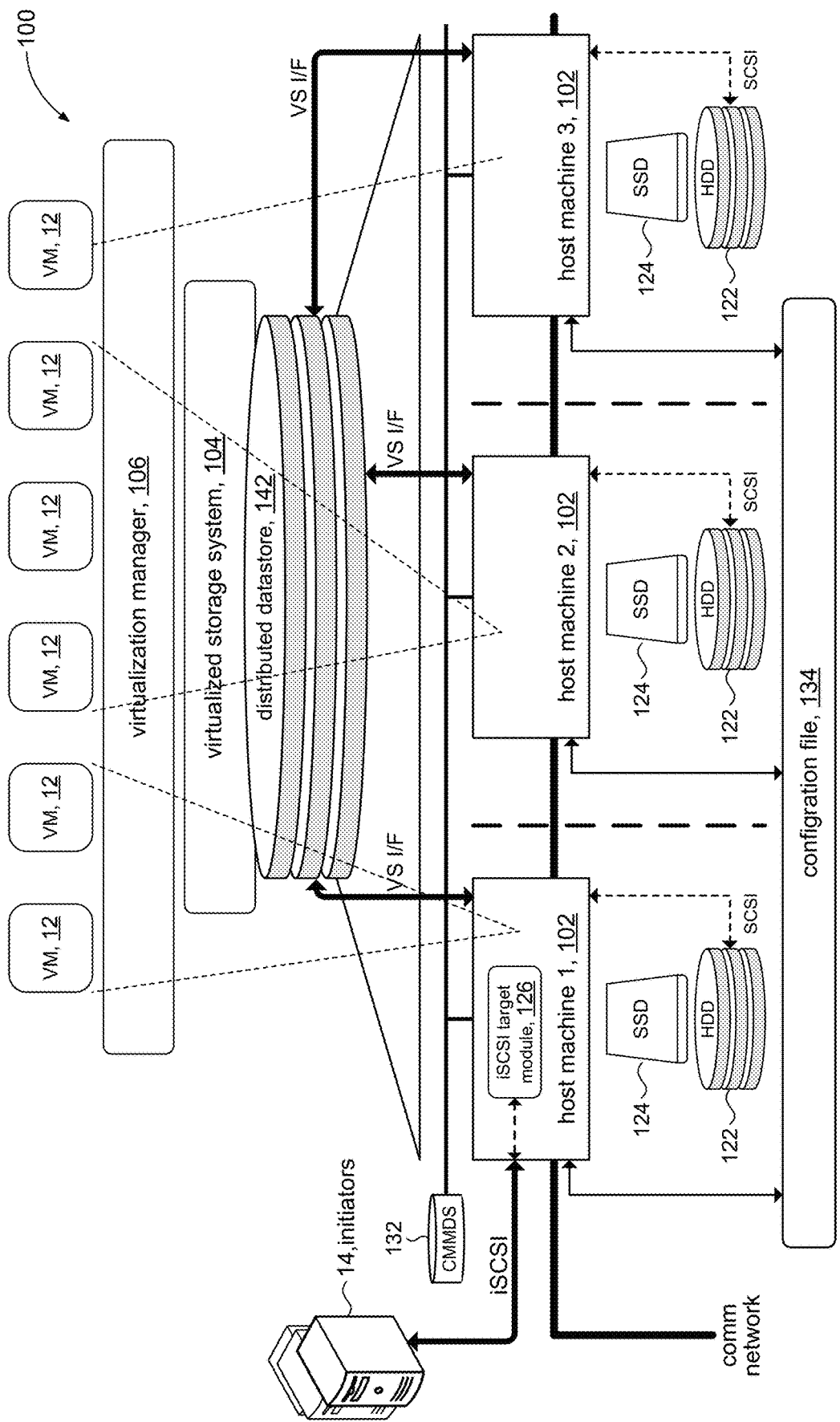
FIG. 1 shows an illustrative embodiment of a virtualization system in accordance with the present disclosure.

FIG. 1 illustrates an example of a virtualization system 100 in accordance with aspects of the present disclosure. The virtualization system 100 may support the definition and configuration of virtual machines (VMs) 12, and the deployment of VMs 12. The underlying hardware that comprises the virtualization system 100 may include host machines 102 and a communication network (e.g., LAN, WAN, not shown) to interconnect the host machines 102. Although FIG. 1 illustrates three host machines 102, it will be appreciated that the virtualization system 100 may comprise additional (or fewer) host machines 102. The VMs 12 may be deployed among the host machines 102, as represented in FIG. 1.

Each host machine 102 (e.g., host machine 1) may include one or more hard disk drives (HDDs) 122 connected to the host machine 102. In some embodiments, the hard disk drives 122 may be configured according to the SCSI (Small Computer System Interface) protocol, and each host 102 may communicate with its local hard disk drives 122 using the SCSI protocol. Each host machine 102 may include a solid state drive or disk (SSD) 124; e.g., for read and write caching. Each host machine 102 may be configured with a hypervisor (e.g., 302, FIG. 3), also referred to as a virtual machine monitor (VMM). The hypervisor may be a combination of computer software, firmware, and/or hardware that supports the execution of VMs 12.

The virtualization system 100 may include a virtualized storage system 104 that provides a virtual distributed datastore 142. As such, the virtualization system 100 may be referred to as a "distributed" virtualization system. The distributed datastore 142 may comprise an aggregation of hard disk drives 122 and solid state drives 124 respectively connected to the host machines 102 that comprise the virtualization system 100. In some embodiments, the hard disk drives 122 may be used to provide persistent storage in the distributed datastore 142, while the solid state drives 124 may serve as read and write caches for data I/O operations. VMs 12 deployed on the host machines 102 may access the distributed datastore 142 via a virtual storage interface (VS I/F) comprising commands and protocols defined by the virtual storage system 104.

The virtualization system 100 may include a virtualization manager 106 to provide various management services to support operations in the virtualization system 100. The virtualization manager 106 may be configured to define distributed (virtual) storage devices allocated from the pool of storage (HDDs) that comprise the distributed datastore 142. The virtualization manager 106 may be configured to define virtual machines 12, and to deploy the virtual machines 12 among the (physical) host machines 102.

Figure 1A:
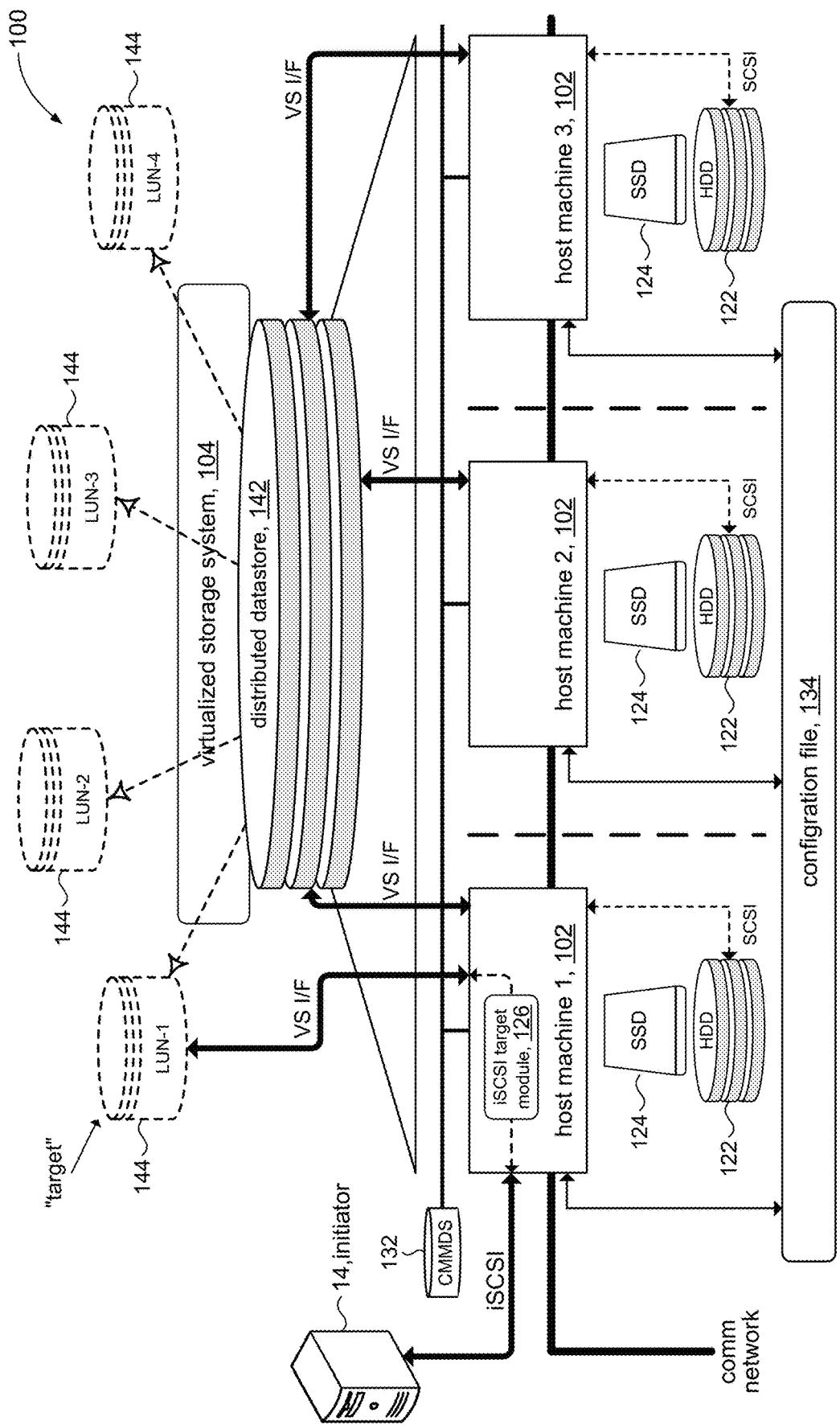
FIGS. 1A and 1B illustrate an example of distributed storage devices in the virtualization system.
Figure 1B:
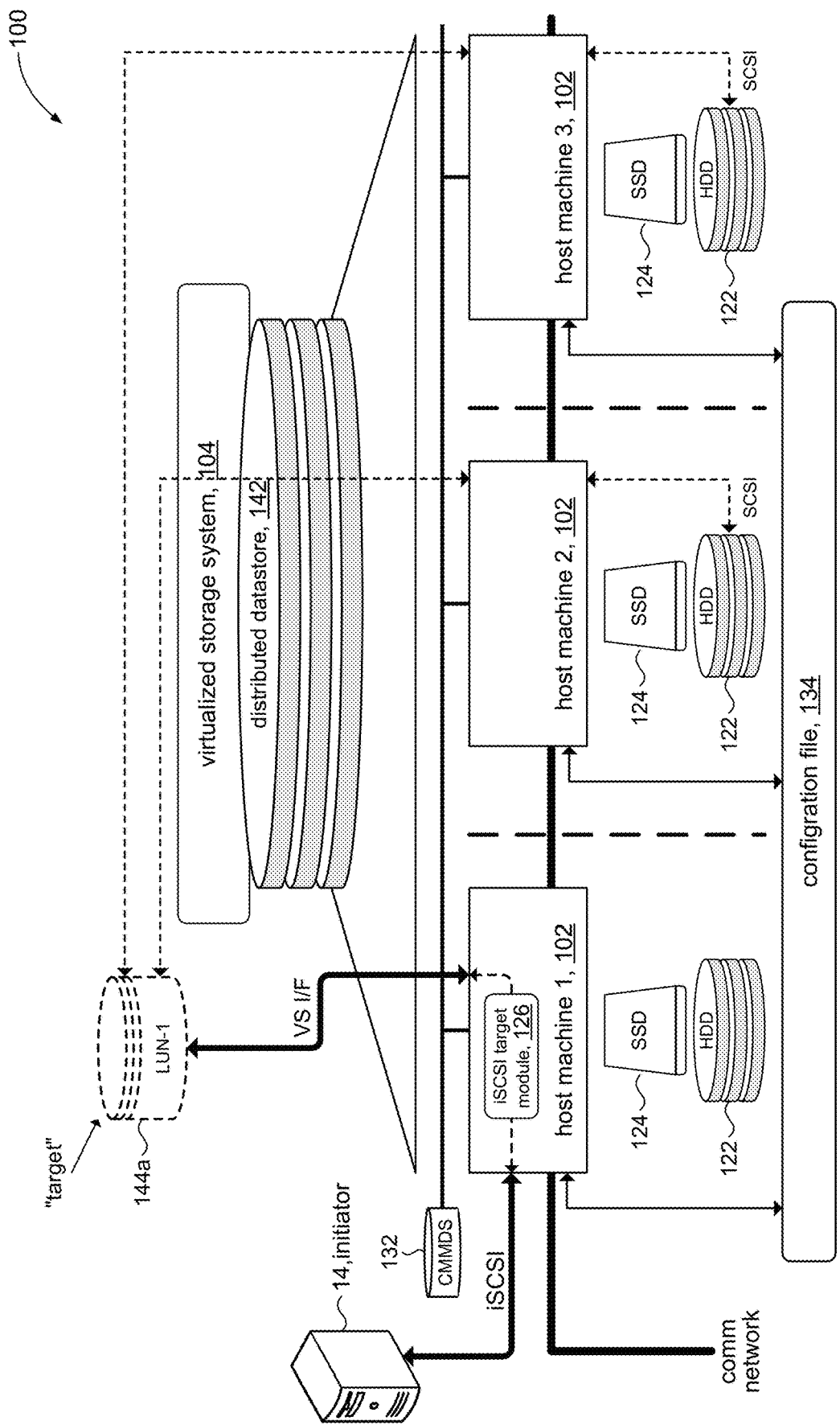

Referring for a moment to FIGS. 1A and 1B, the virtualized storage system 104 may allocate storage from the distributed datastore 142 to define distributed storage devices 144 (also referred to as virtual disks). A distributed storage device 144 may comprise all or part of a hard disk drive 122 connected to one of the host machines 102. More generally, a distributed storage device 144 may comprise or otherwise be defined from the hard disk drives 122 of two ore more different host machines 102; in other words, the storage device 144 is "distributed" in the sense that the storage may comprise storage from all or portions of hard disk drives 122 across multiple host machines 102. For example, a distributed storage device 144 may comprise all or a portion of the storage area on a hard disk drive 122 connected to one host machine 102 (e.g., host machine 1) and all or a portion of the storage area on a hard disk drive 122 connected to another host machine 102 (e.g., host machine 2). Merely to illustrate this point, FIG. 1B shows an example of a distributed storage device 144a. The figure shows that distributed storage device 144a comprises at least a portion of the storage area on the hard disk drive 122 connected to host machine 2 and at least a portion of the storage area on the hard disk drive 122 connected to host machine 3.

Continuing with FIG. 1, the hard disk drives 124 that comprise the distributed datastore 142 may include SCSI-based storage devices to provide block-based storage of data. In accordance with the present disclosure, the virtualization system 100 may be configured to support block-based data access using the iSCSI (Internet SCSI) protocol to access SCSI-based distributed storage devices 144 allocated from the distributed datastore 142. The iSCSI protocol works by transporting block-level data between an iSCSI initiator (initiator) and an iSCSI target (target). The iSCSI protocol encapsulates SCSI commands and assembles the data in iSCSI packets for the TCP/IP layer. The packets are sent over a suitable communication network from an initiator to a target. Upon arrival, the target disassembles the iSCSI packets, separating the SCSI commands in order to access an SCSI device via the interface VS I/F of virtualized storage system 104. The SCSI and iSCSI protocols are well defined and understood protocols.

In accordance with the present disclosure, one or more host machines 102 may be configured as an iSCSI target to provide access to SCSI-based distributed storage devices 144. In some embodiments, for example, one or more host machines 102 may include an iSCSI target module 126 (e.g., as depicted in host machine 1) for communication with one or more iSCSI initiators 14. An initiator 14 can be any suitably configured computer system, such as Windows XP™ PC (desktop or laptops), a server machine (e.g., Oracle™ database server, Windows 2003™ or 2008™ server, etc.), and so on. Generally, in accordance with the present disclosure, initiators 14 may be computer systems that are separate from the host machines 102 that comprise virtualization system 100. Initiators 14 may be virtual machines running on other hypervisor systems such as the Linux-based KVM virtualization infrastructure and XEN hypervisor, Microsoft® Hyper-V™ server, and so on separate from the virtualization system 100.

An initiator 14 may access (e.g., read/write, status inquiry, etc.) one or more distributed storage devices 144 via a host machine 102 using the iSCSI protocol. FIG. 1A, for example, shows host machine 1 (iSCSI target) in communication with initiator 14 via the iSCSI target module 126. In accordance with the present disclosure, host machine 1 (via the iSCSI target module 126) may process the iSCSI protocols to communicate with a distributed storage device 144 (e.g., LUN-1) using commands/protocols defined by the interface VS I/F of the virtualized storage system 104. The virtualization system 100 may include infrastructure to support iSCSI processing by host machines 102 in accordance with the present disclosure. In some embodiments, for example, the infrastructure may include a common data service 132 and a configuration file 134 to store and communicate configuration data used by the host machines 102 to support iSCSI processing.

SCSI-based distributed storage devices 144 are typically identified using logical unit numbers (LUNs). However, it is common for the term "LUN" to also refer to the distributed storage device 144 itself. Along the same lines, the term "iSCSI target" (or simply "target") can refer to a server that provides access to SCSI-based storage; e.g., a host machine 102 configured with an iSCSI target module 126 (e.g., host machine 1) may be referred to as an iSCSI target. However, the term "iSCSI target" may also be used to refer to the SCSI-based storage device itself; e.g., distributed storage device 144 may be referred to as an iSCSI target or simply as a target. An iSCSI target may comprise one or more distributed storage devices 144; and in the context of the iSCSI protocol, each of the distributed storage devices 144 that comprise an iSCSI target may be referred to as a LUN.

It will be understood by those of ordinary skill, that embodiments in accordance with the present disclosure may be practiced in any suitable distributed virtualization system. Merely for the purposes of illustration, however, the virtualization system 100 in accordance with a particular embodiment of the present disclosure may be based on components comprising a virtualization system developed and marketed by VMware Inc. For example, the host machines 102 may each be configured with the ESXi® hypervisor, and may collectively be referred to as a cluster of ESXi® hosts. In accordance with the present disclosure, the ESXi® hypervisor may be configured with iSCSI processing (e.g., via the iSCSI target module 126) so that the host machines 102 can serve as iSCSI targets for initiators 14.

Virtualized storage system 104 may be the VSAN™ storage infrastructure. The VSAN™ storage infrastructure may comprise software components (VSAN modules) that are integrated into the ESXi® hypervisor of each host machine 102, which collectively can be referred to as the virtualized storage system 104. The VSAN modules in the host machines 102 can cooperate to aggregate the local storage (e.g., HDD 122, SSD 124) connected to each host machine 102 as a single virtual distributed datastore 142. The VSAN modules provide coordination among host machines 102 so that data in a distributed storage device 144, which may comprise hard disk drive storage from several host machines 102, can be accessed as a single virtual disk (virtual machine disk, VMDK) or storage device. Accordingly, iSCSI targets (e.g., LUNs) allocated from the distributed datastore 142 can benefit from data services provided by the underlying VSAN™ storage infrastructure, such as fault tolerance, data compression, data de-duplication, checksums, snapshots, and so on.

The virtualization manager 106 may be the vSpehere® web client, which allows users (e.g., system administrators) to connect to a host machine 102 directly or over the Internet. Users may configure the virtualization system 100 via the vSpehere® web client; for example, users may define distributed storage devices 144 from distributed datastore 142, define VMs 12, deploy VMs 12, and so on. In some embodiments (not shown), the virtualization manager 106 may include a vCenter® server that the vSphere® web client may connect to in order to manage a cluster of ESXi® hosts.

Figure 2:
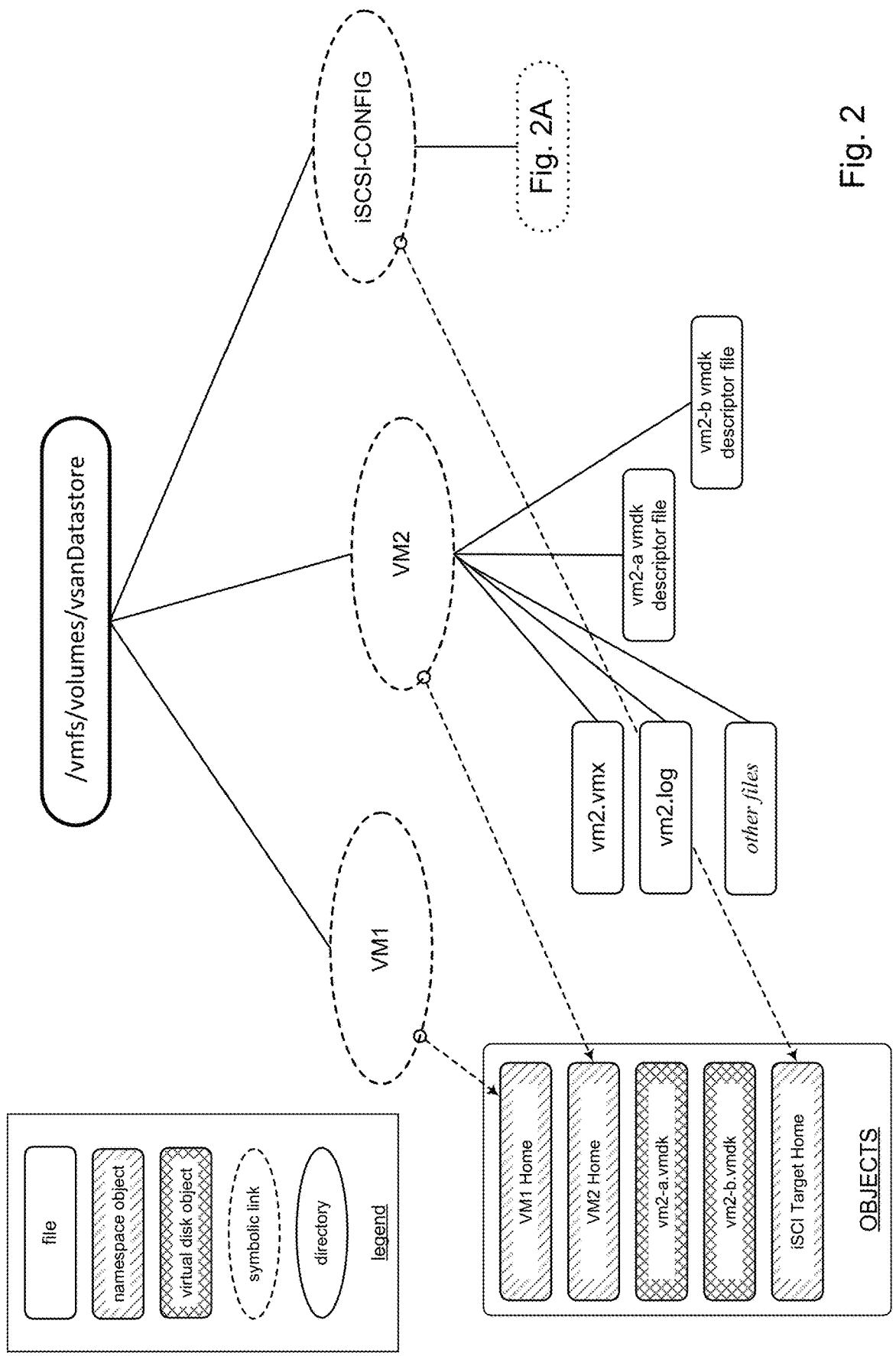
FIGS. 2 and 2A illustrate an example of namespaces in accordance with the present disclosure.

Referring to FIG. 2, in some embodiments, the virtualization system 100 may manage the VMs 12 and their corresponding distributed storage devices 144 (virtual machine disks, VMDKs) as objects. Merely to illustrate this point, virtual machine VM2 shown in FIG. 2 may have several objects associated with it, including for example a namespace object called VM2 Home and two virtual disk objects called vm2-a.vmdk and vm2-b.vmdk. Various files that define virtual machine VM2 may reside in the VM2 Home namespace object, such as descriptor files that include respective descriptive information for the two virtual disks vm2-a.vmdk and vm2-b.vmdk. The symbolic links shown in the figure are discussed below.

In accordance with the present disclosure, a distributed storage device 144 that serves as an iSCSI target is accessible by initiators 14 that are external to the virtualization system 100. Accordingly, such distributed storage devices 144 are not associated with any one virtual machine, but rather stand alone. In some embodiments, a namespace may be defined to manage distributed storage devices 144 that are iSCSI targets. For example, a namespace object called iSCSI Targets Home may serve as the high level namespace object to contain a nested hierarchy of namespace objects for distributed storage devices 144 that are configured as iSCSI targets.

Figure 2A:
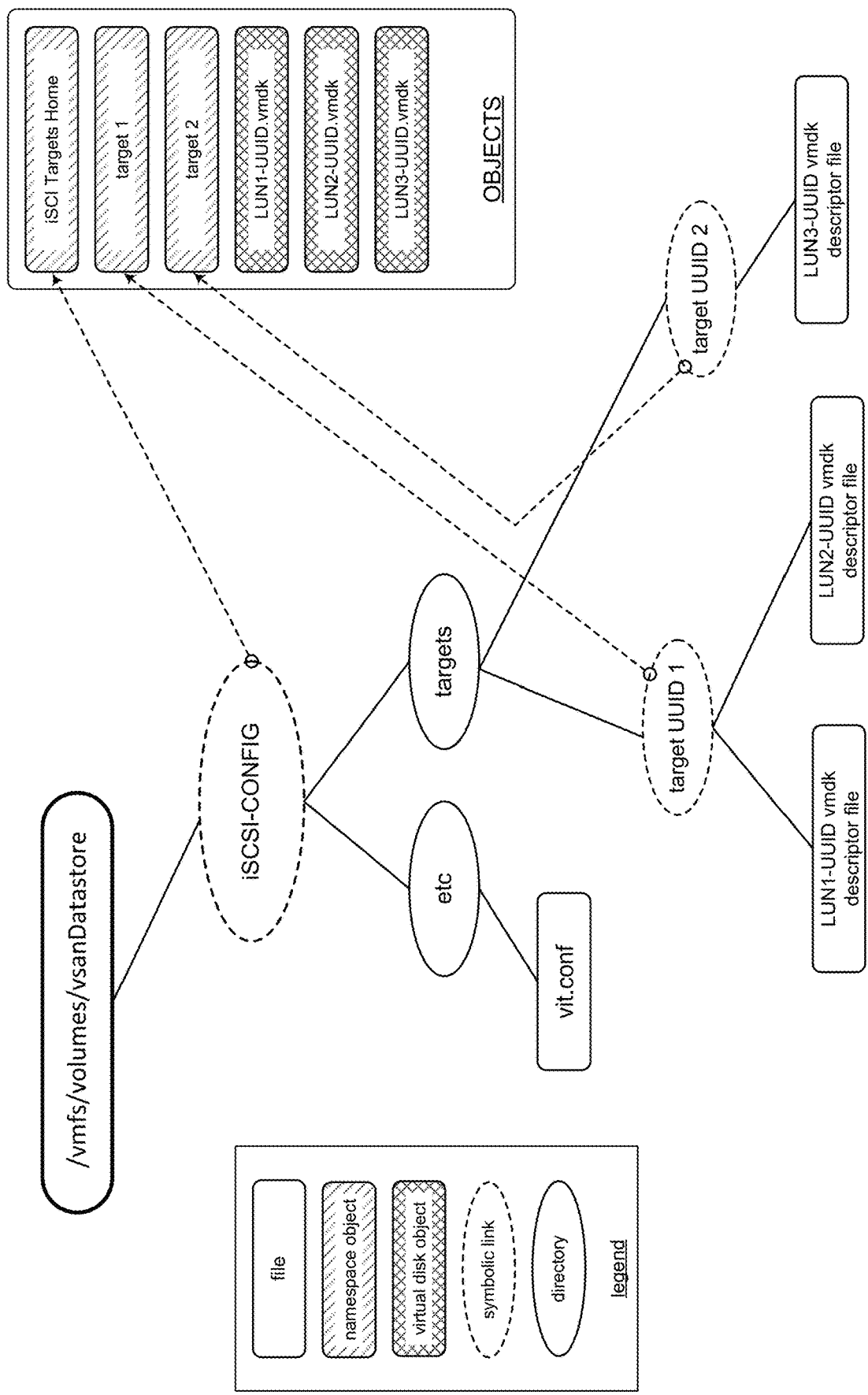

Referring to FIG. 2A, the namespace object called iSCSI Targets Home may include an etc directory to hold various files, for example, configuration file 134 (FIG. 1). A targets directory may hold symbolic links to target namespace objects. Each target namespace object may be associated with an iSCSI target and may include descriptor files that contain information for one or more distributed storage devices 144 (LUNs) that constitute the iSCSI target. Merely to illustrate this point, the example in FIG. 2A shows an iSCSI target identified by the target namespace object called target 1, which includes descriptor files containing respective descriptive information for two virtual disk objects called LUN1-UUID.vmk and LUN2-UUID.vmdk that constitute the iSCSI target. Similarly, the iSCSI target identified by the target namespace object called target 2 includes a descriptor file that includes respective descriptive information for the virtual disk object called LUN3-UUID that defines the iSCSI target.

The objects (e.g., namespace objects, virtual disk objects) may be related by way of symbolic links to create a hierarchical representation of the objects that comprise the virtualized storage system 104. The symbolic links provide a persistent map of the hierarchy. FIG. 2, for example, shows a symbolic link called VM2 that represents a virtual machine called VM2. The symbolic link points to the VM2 Home namespace object. The virtual disk objects (vm2-a.vmdk and vm2-b.vmdk) for VM2 can be accessed using information contained in their respective descriptor files. Likewise, with reference to FIG. 2A, the symbolic link called iSCSI-CONFIG provides a persistent map of the iSCSI targets defined in the virtualization system 100. The symbolic links under the targets directory represent iSCSI targets and point to the target namespace objects that define the iSCSI targets. For example, the symbolic link target UUID 1 represents an iSCSI target and points to the target 1 namespace object that defines the iSCSI target. Likewise, the symbolic link target UUID 2 represents another iSCSI target and points to the target 2 namespace object that defines the iSCSI target.

Figure 3:
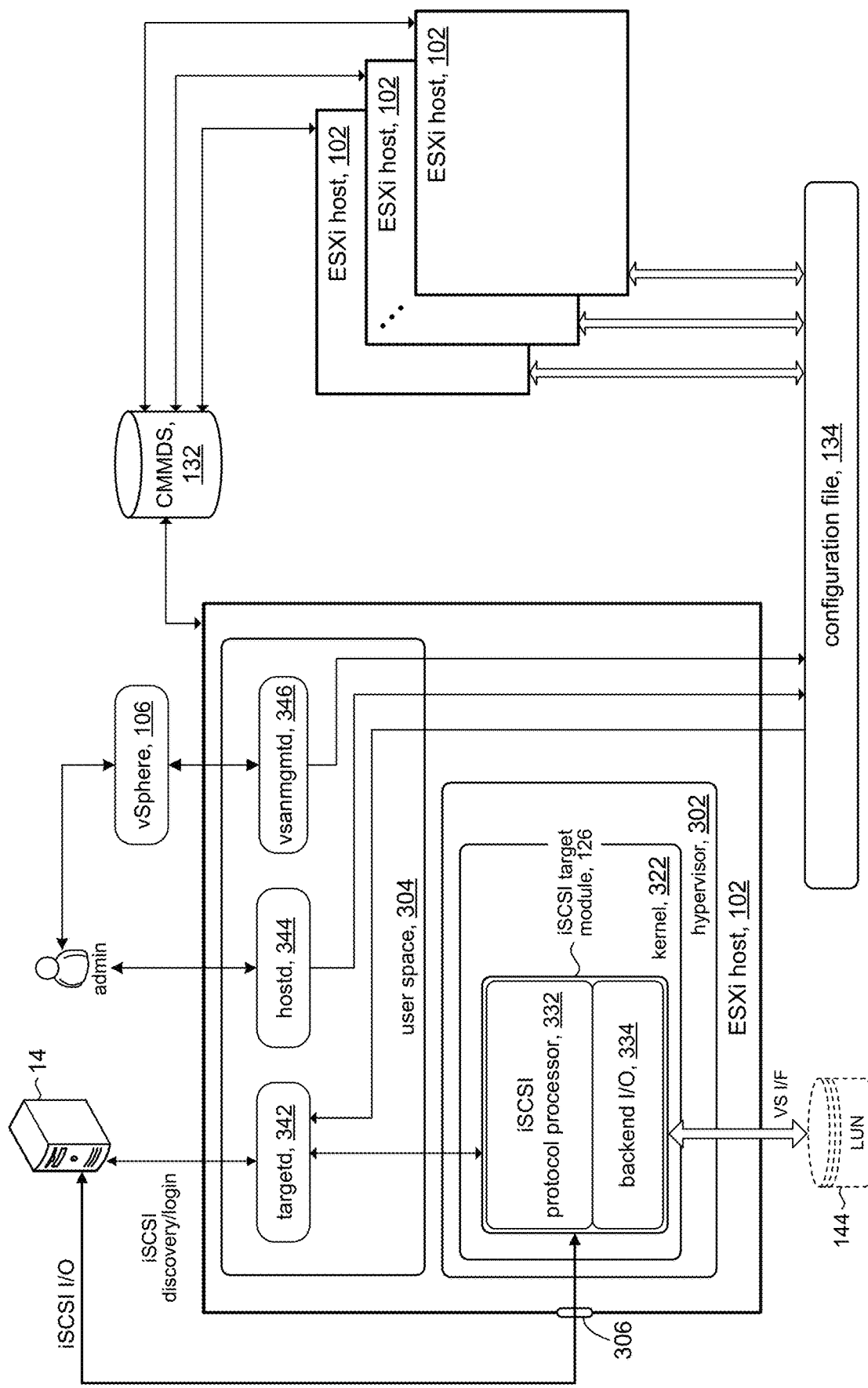
FIG. 3 illustrates details of a host machine in accordance with the present disclosure.

Referring to FIG. 3, additional details of the virtualization system 100 in accordance with some embodiments of the present disclosure will now be discussed. In some embodiments, each host machine 102 may include a hypervisor 302 (e.g., ESXi® hypervisor) comprising software components that support the execution of VMs 12 (FIG. 1). The hypervisor 302 may include a kernel 322, which among other tasks, can mediate I/O access with distributed storage devices 144 allocated from the distributed datastore 142 using commands/protocols of the virtual storage interface (VS I/F) of virtual storage system 104.

In accordance with the present disclosure, the kernel 322 may include an iSCSI target module 126 to process iSCSI protocols within the hypervisor 302. In some embodiments, the iSCSI target module 126 may comprise an iSCSI protocol processor module 332 to unpack an inbound iSCSI protocol packet and access a SCSI command encapsulated in the inbound iSCSI protocol packet. The iSCSI target module 126 may comprise a backend I/O processing module 334 to access the distributed storage device 144 identified in the inbound iSCSI protocol packet, for example, using the file system commands and protocols defined by the interface VS I/F of the virtualized storage system 104. In accordance with the present disclosure, the backend I/O processing module 334 may translate between iSCSI protocols and the VS I/F file system commands and protocols to service SCSI commands in the iSCSI requests from initiator 14. As explained above, a distributed storage device 144 may comprise storage aggregated from local storage (e.g., HDD 122, SSD 124) across several host machines 102. In accordance with the present disclosure, the backend I/O processing module 334 may be configured to access (e.g., via the virtualized storage system 104) those host machines 102 whose local storage comprise the identified distributed storage device 144.

Host machine 102 may include an execution environment called a user space 304 within which various processes of the host machine 102 can execute. The user space 304 may include, for example, a host daemon process (hostd) 344 and a management daemon process (vsanmgmtd) 306. The host daemon 344 may allow a user (e.g., system administrator) to access the host machine 102 directly. The host daemon 344 may provide a command line interface to allow users to configure the host machine 102. The management daemon 346 may be configured as a server to allow users remote access the host machine 102; e.g., over the Internet. In accordance with embodiments of the present disclosure, the host daemon 344 and the management daemon 346 may facilitate the definition and configuration of distributed storage devices 144 to be used as iSCSI targets and to store some information relating to the iSCSI targets in the configuration file 134.

In accordance with some embodiments, the user space 304 may include a target daemon process (targetd) 342. The target daemon 342 may be configured to handle authentication (e.g., login processing), authorization, and target discovery processing pursuant to the iSCSI protocol for iSCSI initiators 14. The target daemon 342 may also be configured to monitor changes in and access to information relating to the configuration of iSCSI targets contained in configuration file 134, and to push that information to the kernel 322. In some embodiments, the target daemon 342 may also interact with the common data service 132 to monitor for changes in the configuration of iSCSI targets, and to push that information to the kernel 322.

The host machines 102 may include a TCP/IP communication port 306 for communication in accordance with TCP/IP. The communication port 306 may be any suitable network interface (wired or wireless) that can provide a point-to-point connection over a TCP/IP network infrastructure.

Figure 4:
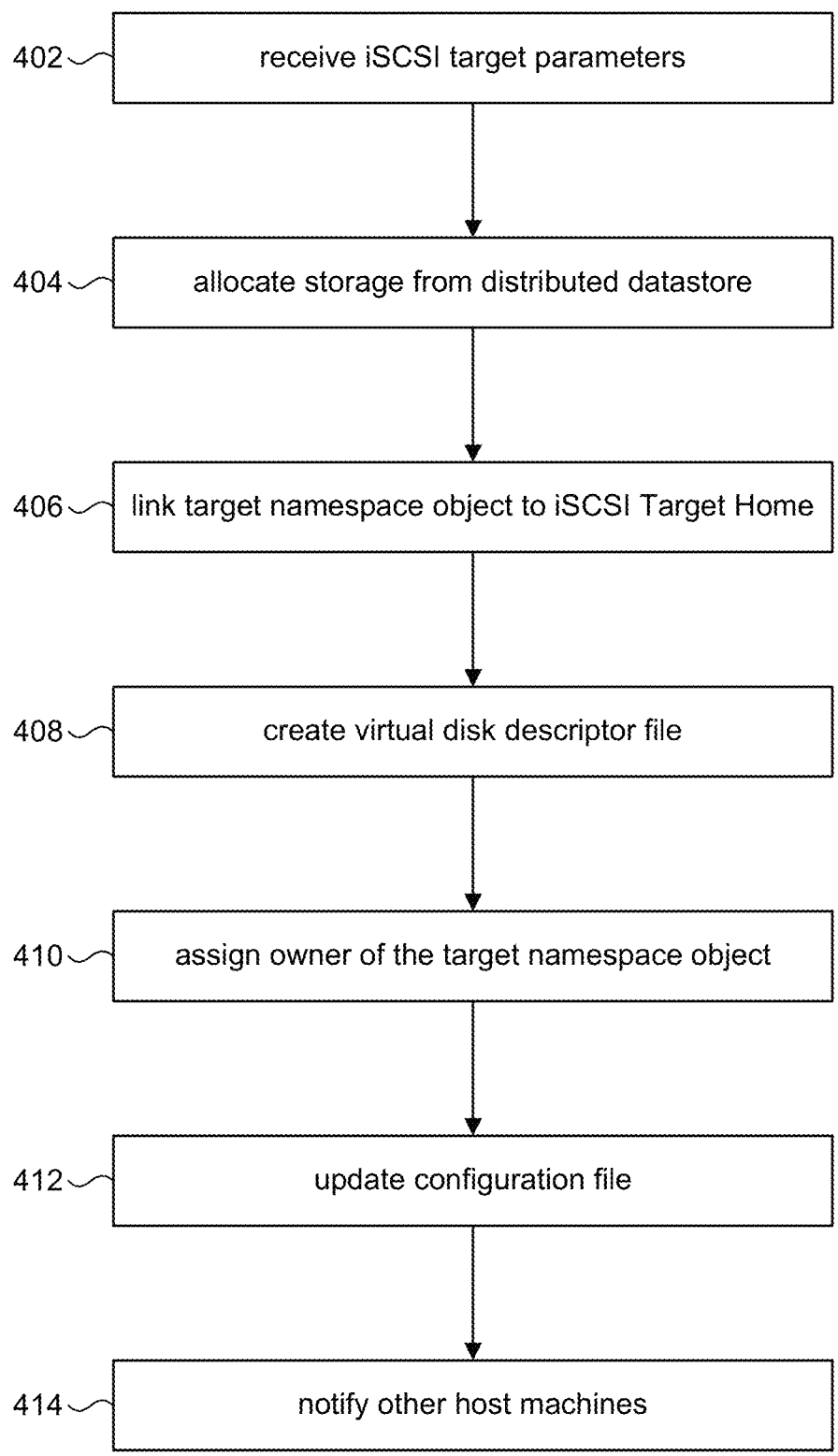
FIG. 4 illustrate processing to define a distributed data store in accordance with the present disclosure.

Referring to FIG. 4, the discussion will now turn to a high level description of processing in the host machine 102 to define iSCSI targets (storage) in accordance with the present disclosure. In some embodiments, for example, the host machine 102 may include computer executable program code (e.g., host daemon 344, management daemon 346), which when executed by a processing unit (e.g., 912, FIG. 9), may cause the processing unit to perform processing in accordance with FIG. 4.

At block 402, the host machine 102 may interact with a user (e.g., an administrative user) to define an iSCSI target. As explained above, an iSCSI target may comprise one or more distributed storage devices 144 (LUNs). Accordingly, the host machine 102 may receive input from the user that specifies parameters for one or more distributed storage devices 144 (LUNs) that comprise the iSCSI target being defined. In some embodiments, for example, the user may interact with the host daemon 344 (e.g., via a command line interface) in host machine 102, or with the management server 346 via a graphical user interface to define the constituent LUN(s). For each LUN, the user may provide a name for the LUN, a block size (e.g., 1,2,4, or 8 MB), a storage size (capacity) for the LUN, and so on.

At block 404, the host machine 102 (e.g., by way of virtualized storage system 104) may allocate from the distributed datastore 142 distributed storage devices 144 (e.g., one for each LUN) in accordance with the parameters specified by the user. As explained above, a distributed storage device 144 may comprise areas of storage on hard disk drives (122, FIG. 1) that are connected to several different host machines 102. FIG. 1B illustrates an example of a distributed storage device 144a (LUN-1) comprising storage from hard disk drives 122 connected to host machine 2 and host machine 3.

Figure 4A:
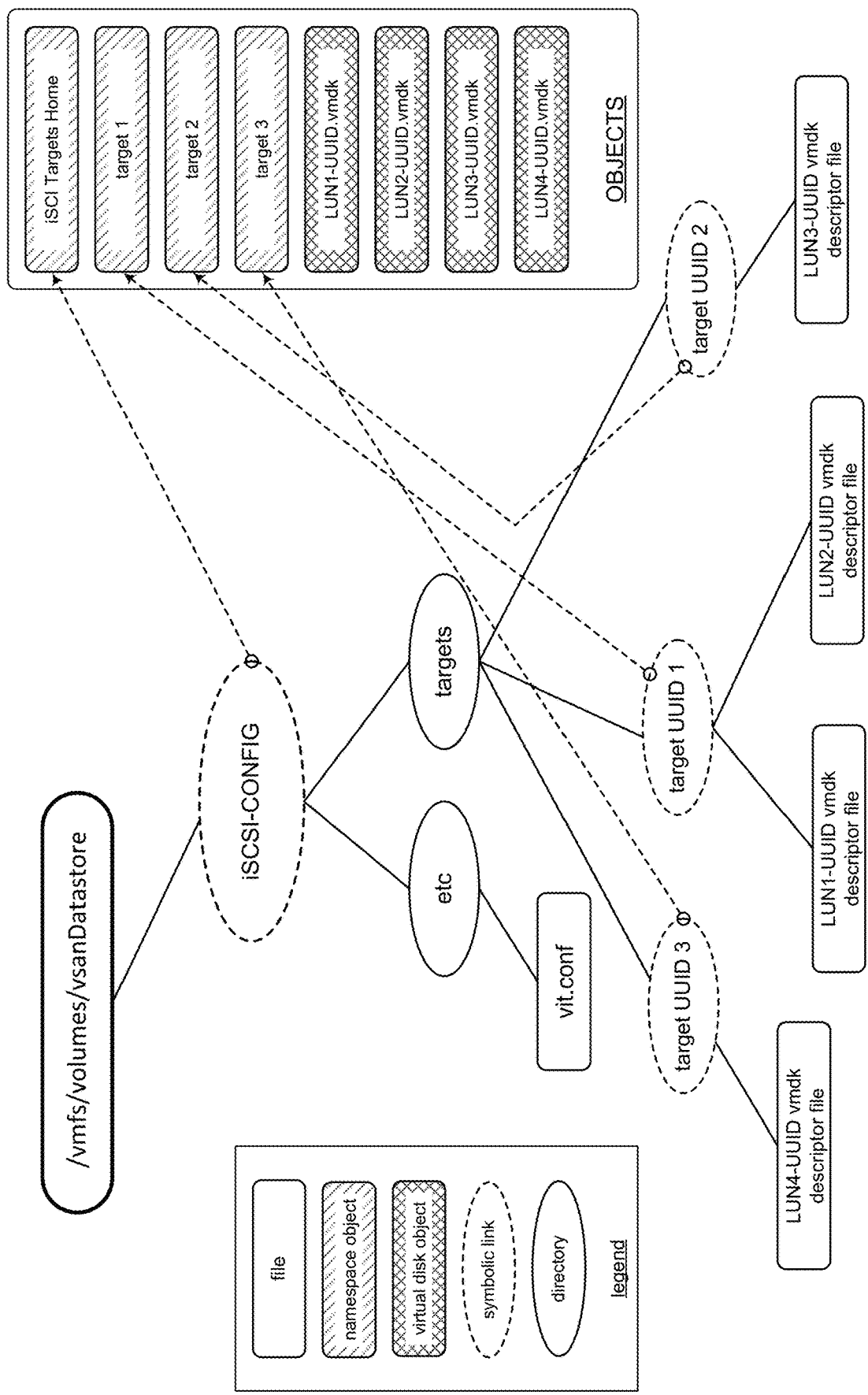
FIG. 4A illustrates an updated namespace pursuant to defining a distributed storage device.

A virtual disk object (e.g., a ".vmdk" file) may be created for each distributed storage device 144 that is allocated from the distributed datastore 142. Merely to illustrate this point, FIG. 4A shows a virtual disk object called LUN4-UUID-.vmdk having been added to the namespace shown in FIG. 2A that represents a newly created LUN for the iSCSI target being defined. This may be repeated for each LUN that comprises the iSCSI target being defined.

At block 406, the host machine 102 (e.g., by way of virtualized storage system 104) may create a target namespace object for the iSCSI target being defined. A link to that namespace object may be added in the targets directory in the iSCSI Targets Home namespace object. The illustrative example in FIG. 4A shows a target namespace object called target 3, which is associated with the iSCSI target being defined. A symbolic link called target UUID 3 is added to the targets directory, thus adding the iSCSI target being defined (identified by target 3) to the hierarchy of iSCSI targets in the iSCSI Targets Home namespace object.

At block 408, the host machine 102 (e.g., by way of virtualized storage system 104) may create a virtual disk descriptor file to describe various attributes of each virtual disk created at block 404, including the location of the virtual disk object. The virtual disk descriptor file(s) may be added to the target 3 namespace object by way of the symbolic link target UUID 3. The illustrative example in FIG. 4A shows that the iSCSI target being defined is represented in the iSCSI Targets Home namespace object by a symbolic link (target UUID 3) to the target 3 namespace object, and comprises one LUN that is described by a descriptor file for the virtual disk object LUN4-UUID.vmdk.

At block 410, the host machine 102 may designate an owner to the newly defined/created one or more LUNs that constitute the iSCSI target, and may be referred to as "owner," "target owner," and the like. In accordance with the present disclosure, the owner may be a host machine 102. In some embodiments, the owner of the target namespace object for the LUN (e.g., target 3, FIG. 4A) may be used to determine the owner of the LUN. In some embodiments, the iSCSI target owner may be the host machine within which the iSCSI target was defined. In other embodiments, the owner may be designated by the virtualized storage system 104 according to some predetermined criteria (e.g., assigning ownership of LUNs evenly across host machines 102), and so on.

At block 412, the host machine 102 may update the configuration file 134 with information about the newly defined iSCSI target. In some embodiments, for example, an object UUID of the newly defined iSCSI target may be stored in the configuration file 134.

At block 414, the host machine 102 may notify the other host machines of the newly defined iSCSI target; for example, by way of data service 132 (FIG. 1). In a particular embodiment, for example, the VMware® ESXi™ host machines provide a shared data service called the Cluster Monitoring, Membership, and Directory Service (CMMDS) to notify host machines of various changes in configuration. The host machine 102 can use this service to notify other host machines 102 in the virtualization system 100 that a new iSCSI target has been defined/created, including notifying who the owner is, when there is a new owner, and so on. This notification aspect of the present disclosure will now be discussed.

Figure 5:
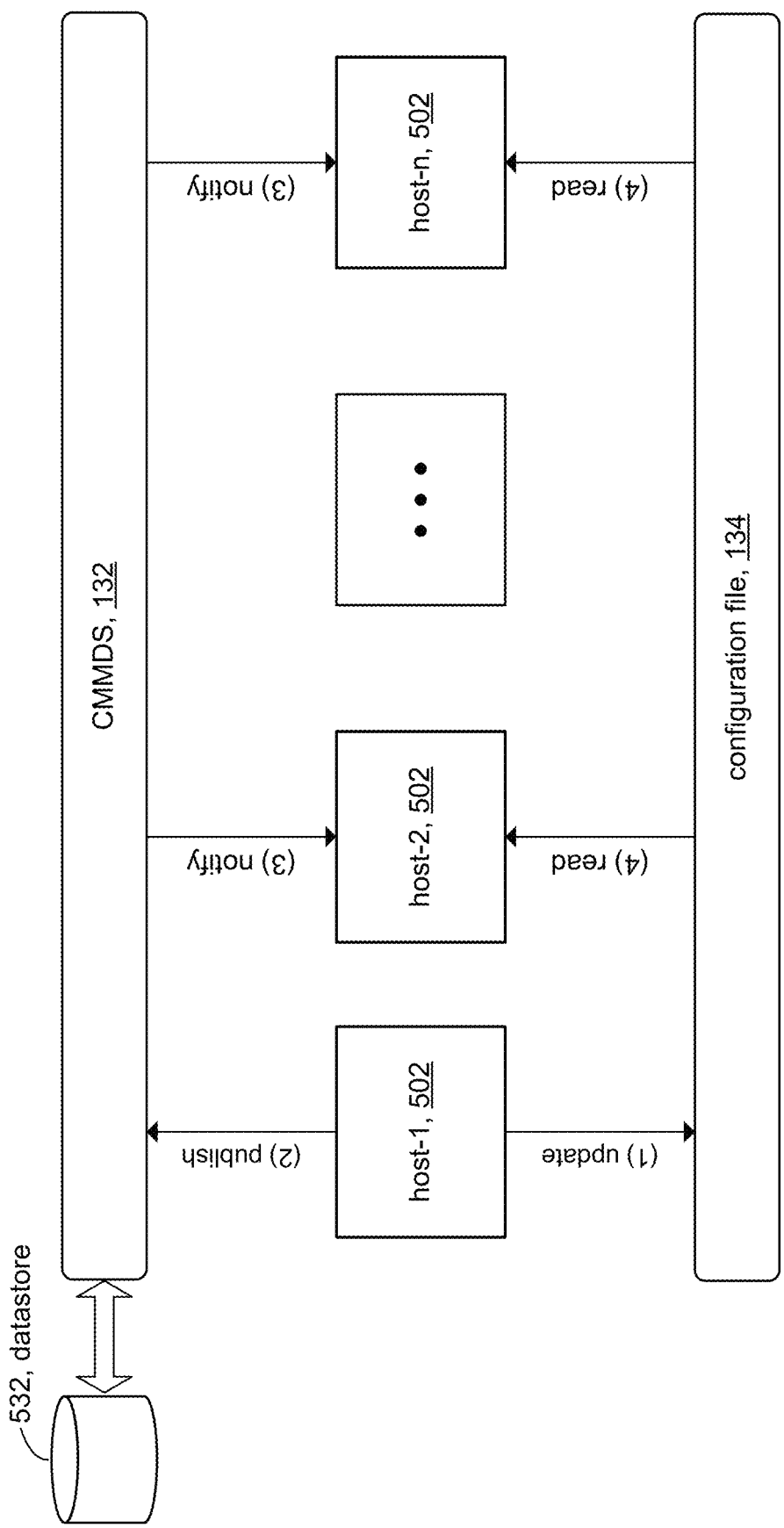
FIG. 5 illustrates processing in a data service in accordance with the present disclosure.

Referring to FIG. 5, a brief discussion of the operation of CMMDS 132 is given. As explained above, the CMMDS 132 is a data service mechanism that can be used to deliver notifications among host machines 502 that comprise virtualization system 100 (FIG. 1). Each host machine 502 may subscribe to the CMMDS 132. The CMMDS 132 may include a datastore 532 to maintain a list of subscribed host machines 502. Host machines 502 may announce changes to a component in the virtualization system 100, which may be stored in the datastore 502. The CMMDS 132 may notify subscribed host machines 502 of those changes.

Suppose for example, a user used host machine host-1 to define/create an iSCSI target and that host-1 is the owner of the newly defined iSCSI target (e.g., host-1 owns the target namespace associated with the iSCSI target). Host-1 may make an update (1) to the configuration file 134 as discussed above. Host-1 may then publish (2) a notification to CMMDS 132 indicating that a change has been made to the configuration file 134. The CMMDS 132 may notify (3) all hosts machines 502 that have subscribed to the CMMDS 132.

Each host machine 502 that has subscribed to the CMMDS 132 may read (4) the configuration file 134 in response to the notification to identify the changes made in the configuration file 134. In accordance with the present disclosure, each host machine 502 is responsible for determining what changed in the configuration file 134, and making any corresponding changes locally to that host machine 502. This approach of giving each host machine 502 its own responsibility of determining what changed in the configuration file 134 avoids the complexities and overhead of maintaining and synchronizing a global system state of all the host machines 502 in the virtualization system 100.

Figure 6:
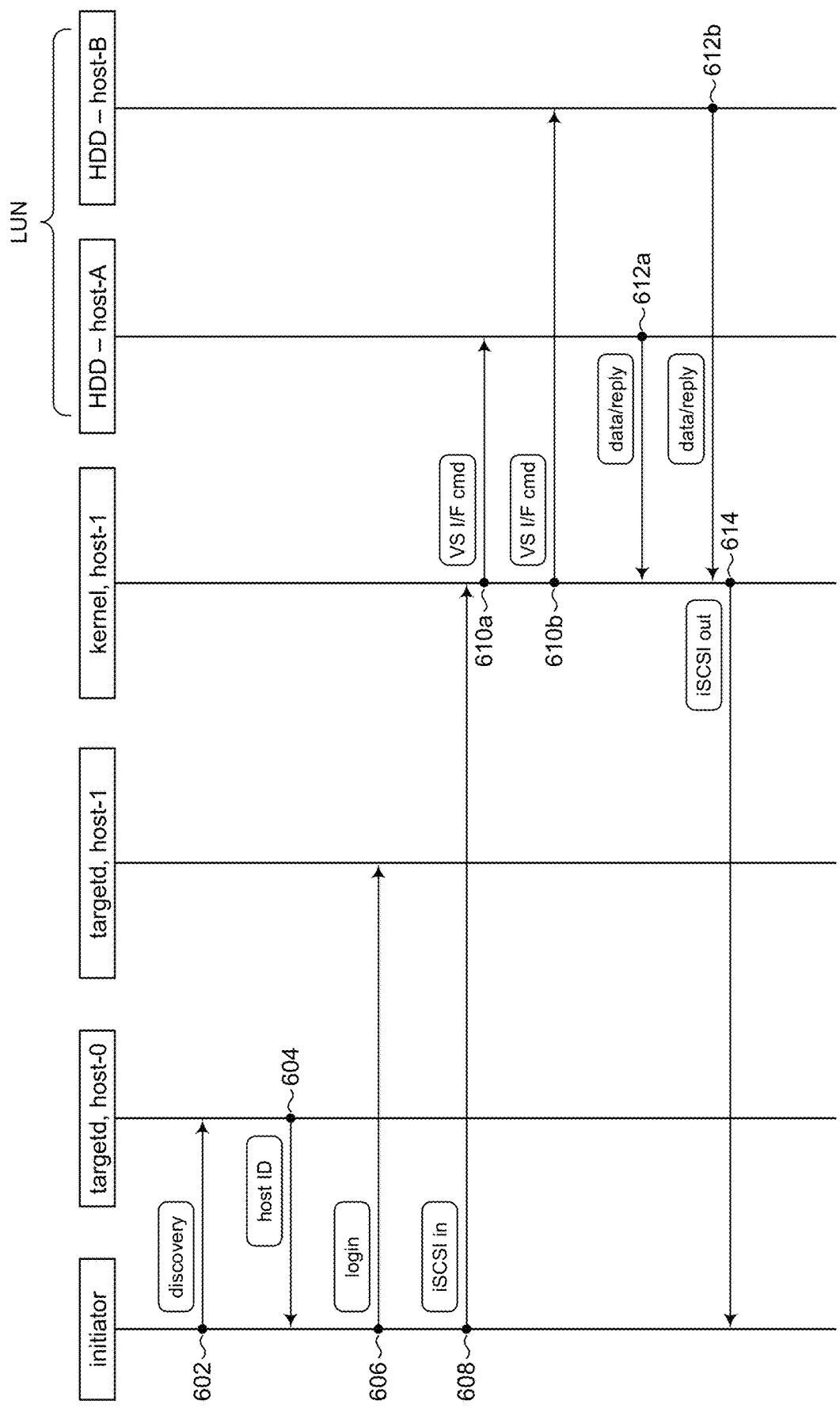
FIG. 6 shows a communication flow in accordance with the present disclosure.

Referring to FIG. 6, a communication flow diagram will be used to explain a communication sequence for iSCSI processing in virtualization system 100 (FIG. 1) in accordance with the present disclosure. The initiator 14 (FIG. 1) may initially perform (602) a discovery operation with one of the host machines (e.g., host-0) as an initial step in conducting iSCSI I/O on a given iSCSI target; e.g., the initiator 14 may be configured to always initially communicate with host-0 for discovery purposes. In some embodiments the initiator 14 may communicate with the target daemon 342 (FIG. 3) in host-0 to perform discovery.

Host-0 may return (604) information that identifies the target host machine (e.g., host-1) that owns the given iSCSI target. For example, the information may be an IP address and TCP port number of host-1, and in particular may be the IP address of communication port 306 (FIG. 3) on host-1. Although FIG. 6 shows host-0 and host-1 as separate host machines, host-0 and host-1 may be the same host machine, depending on who owns the given iSCSI target. In other words, host-0 may be the owner of the given iSCSI target, or host-0 may not be the owner of the given iSCSI target. FIG. 6 illustrates the general case in which the owner of the given iSCSI target, namely host-1, may be any host machine 102 in the virtualization system 100, including the initial host machine host-0.

The initiator 14 may perform (606) a login/authentication sequence with host-1. The initiator may then perform (608) iSCSI-based I/O with host-1, where the processing of an inbound iSCSI protocol packet may be processed in the kernel 322 (FIG. 3) of host-1. More particularly, the SCSI command contained in the iSCSI protocol packet may be used to access a LUN comprising the given iSCSI target. As explained above, a LUN (i.e., a distributed storage device 144) may comprise storage from the hard disk drives 122 (FIG. 1) that are connected to different host machines 102 in the virtualization system 100. Accordingly, the kernel 322 in host-1 may communicate (610*a*, 610*b*) VS I/F commands/protocols with the host machines 102 (e.g., host-A, host-B), whose hard disk drives 122 comprise the target LUN in the given iSCSI target, to service the SCSI command contained in the iSCSI protocol packet. The kernel 322, therefore, effectively "translates" the SCSI command received in the iSCSI protocol packet to corresponding VS I/F commands/protocols of the of the virtualized storage system 104 in order to service the SCSI command. It is noted that host-A and host-B may be any host machine 102 in the virtualization system 100, including host-0 and host-1. The host machines 102 (e.g., host-A, host-B), in turn, may access their respective local hard disk drives 122 using SCSI commands to the necessary I/O to service the respectively received VS I/F command/protocols.

The kernel 322 in host-1 may receive (612*a*, 612*b*) data accessed from the hard disk drives 122 that constitute the LUN of the given iSCSI target in response to the VS I/F commands/protocols communicated at 610*a*, 610*b*. The kernel 322 may coordinate and assemble the return data, received as VS I/F based responses, from the constituent hard disk drives 122 into a SCSI command. The kernel 322 may package the SCSI command in an outbound iSCSI protocol packet and send (614) the outbound iSCSI protocol packet to the initiator 14. Again, the kernel 322 in effect translates the VS I/F based responses to build an appropriate SCSI command.

Figure 7:
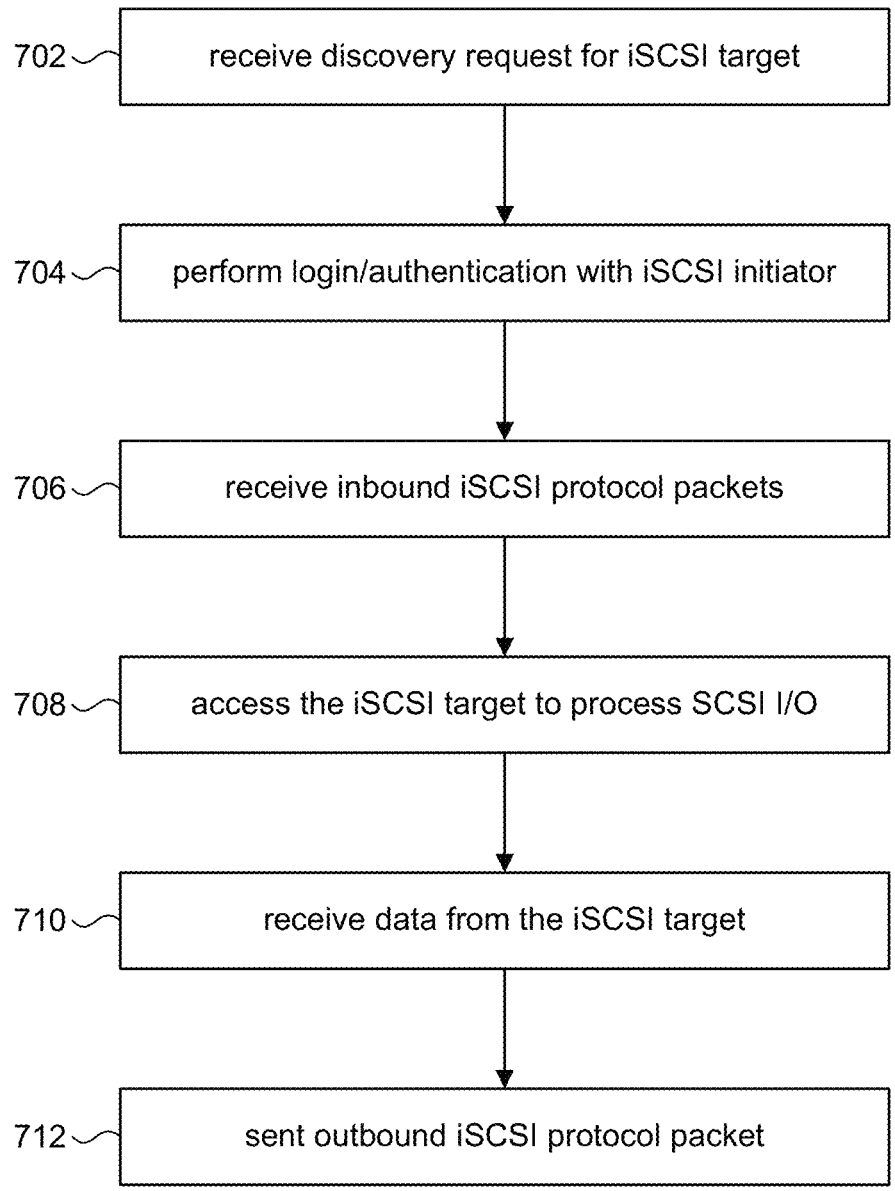
FIGS. 7 and 7A illustrate processing in a host machine in accordance with the present disclosure.

Referring to FIG. 7, and with reference to the communication diagram of FIG. 6, the discussion turns now to a high level description of some processing in the kernel 322 of a host machine 102 to process an inbound iSCSI protocol packet in accordance with the present disclosure. In some embodiments, for example, the kernel 322, and in particular the iSCSI protocol processor module 332 and the backend I/O processing module 334, may include computer executable program code, which when executed by a processing unit (e.g., 912, FIG. 9), may cause the processing unit to perform processing in accordance with FIG. 7.

At block 702, the host machine 102 (and in particular, the target daemon 342 for example) may receive from an initiator 14 a discovery request. In some embodiments, for example, the request may be based on functionality such as provided by the iscsiadm( ) utility, a command-line tool allowing discovery of iSCSI targets. The discovery request may specify the iSCSI target of interest. In some embodiments, the target daemon 342 may query the data service 132 for information that identifies the owner (a host machine 102) of the specified iSCSI target, referred to herein as the "target owner." The target daemon 342 may return suitable identifying information to the initiator 14 that can allow the initiator 14 to communicate with the target owner; e.g., an IP address and TCP port number of the target owner. Using the received identifying information, the initiator 14 may perform iSCSI I/O on the specified iSCSI target by sending iSCSI protocols to the target owner.

At block 704, the target owner host machine 102 may receive a login request or other authorization request from the initiator 14. The target daemon 342 on the target owner host machine 102 may grant or deny access to the initiator 14. If access is granted, the initiator 14 may communicate iSCSI protocol packets over TCP/IP with the target owner host machine 102 to conduct iSCSI I/O with the specified iSCSI target.

At block 706, the target owner host machine 102 may receive an inbound iSCSI protocol packet (e.g., via its communication port 306). The iSCSI protocol packet is a TCP/IP packet and may be processed in the kernel 322 of the target owner host machine 102. More particularly, the iSCSI protocol processor module 332 in the target owner host machine 102 may unpack the inbound iSCSI protocol packet to access (1) a LUN identifier and (2) a SCSI command (e.g., command descriptor block, CDB). As explained above, an iSCSI target may comprise one or more LUNs. The LUN identifier may identify a constituent LUN of the specified iSCSI target.

At block 708, the target owner host machine 102 may access the specified LUN to process the SCSI command determined in block 706. As explained above, a LUN is a distributed storage device 144 allocated from distributed datastore 142. The specified LUN, therefore, may comprise storage areas from hard disk drives 122 connected to different host machines 102 in the virtualization system 100. The backend I/O processing module 334 in the target owner host machine 102 may communicate commands/protocols defined per the VS I/F interface of the virtualized storage system 104 to perform I/O operations in the host machines 102 to which the constituent hard disk drives of the specified LUN are connected in order to service the SCSI command obtained in block 706.

Figure 7A:
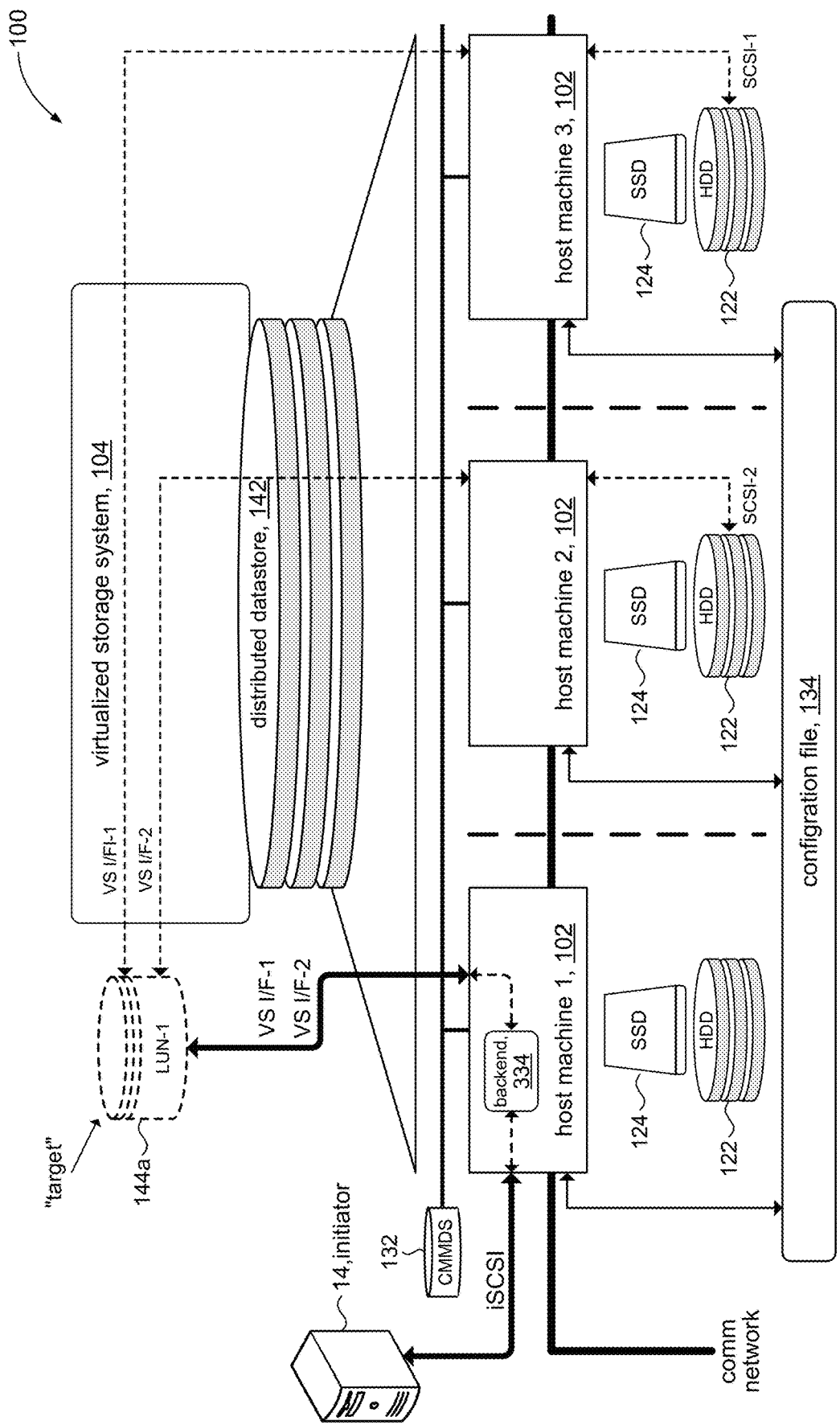

Referring for a moment to FIG. 7A, for example, host machine 1 depicts an example of receiving an inbound iSCSI protocol packet from initiator 14, targeting LUN-1 for I/O. Assuming that LUN-1 comprises storage from hard disk drive 122 on host machine 2 and storage from hard disk drive 122 on host machine 3, the backend I/O processing module 334 in host machine 1 may communicate (via the virtualized storage system 104) commands and/or protocols (VS I/F-1) to host machine 2 and commands and/or protocols (VS I/F-2) to host machine 3. Each host machine may communicate with its own respective hard disk drives 122 using SCSI commands to perform the necessary I/O.

Continuing with FIG. 7, at block 710, the target owner host machine 102 may receive responses from the constituent hard disk drives that comprise the specified LUN in response to the VS I/F commands (e.g., VS I/F-1, VS I/F-2, FIG. 7A). The responses may include data accessed from the constituent hard disk drives 122.

At block 712, the target owner host machine 102 may send an outbound iSCSI protocol packet to the initiator 14 in response to the inbound iSCSI protocol packet. In some embodiments, for example, the iSCSI protocol processor module 332 in the target owner host machine 102 may encapsulate the response data received at block 710 in an outbound iSCSI protocol packet. The iSCSI protocol processor module 332 may then transmit the outbound iSCSI protocol packet to the initiator 14 over TCP/IP; e.g., via the communication port 306 of the target owner host machine 102.

As explained above, every host machine 102 in the virtualization system 100 may be configured to provide iSCSI service; i.e., can be an iSCSI target. Accordingly, every host machine 102 may publish (e.g., through discovery) the same view to initiators 14. In other words, the initiators 14 can see a global view of iSCSI targets and LUNs from every host machine 102 in the virtualization system 100. If the iSCSI target is no longer accessible by its owner (e.g., the owner experiences a failure or a network partition occurs), the initiator 14 may be re-directed to a new owner.

Figure 8:
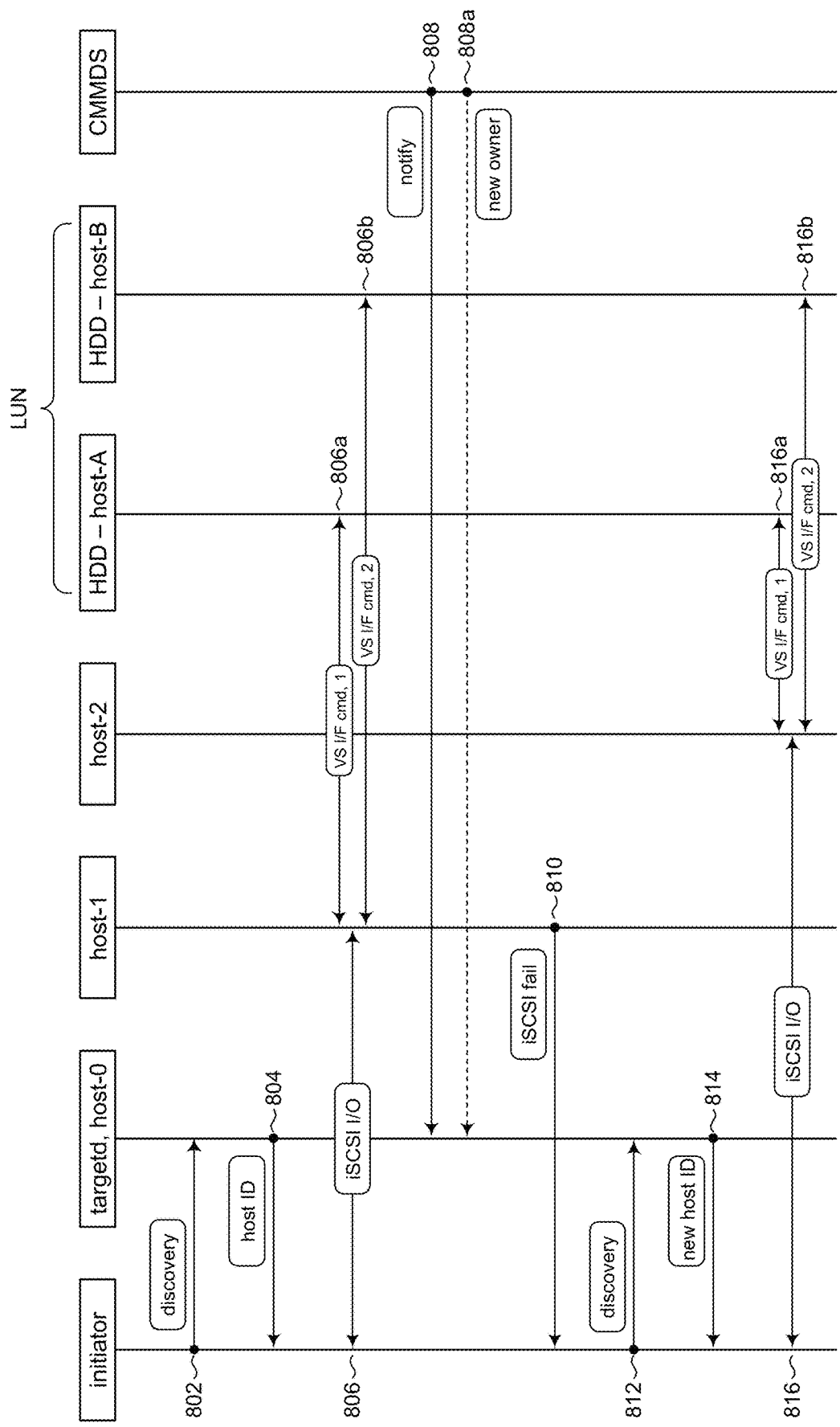
FIG. 8 shows a communication flow for initiator redirection in accordance with the present disclosure.

Referring to FIG. 8, a communication flow diagram will be used to explain a communication sequence for re-direction of iSCSI processing in accordance with the present disclosure. As explained above, in connection with FIG. 6, the initiator 14 may initially perform (802) a discovery operation with one of the host machines (e.g., host-0) as an initial step in conducting iSCSI I/O with a given iSCSI target. Host-0 may return (804) information that identifies the target host machine (e.g., host-1) that initially owns the given iSCSI target. After a login sequence with host-1, the initiator 14 may perform (806) iSCSI-based I/O with host-1, which may include host-1 performing (806a, 806b) SCSI I/O with host machines 102 (e.g., host-A, host-B) whose hard disk drives 122 comprise the target LUN in the given iSCSI target, as explained above.

If iSCSI I/O with host-1 is no longer possible (e.g., due to a failure in host-1 or a network partition), this occurrence may be detected by the data service 132 (e.g., CMMDS, FIG. 5). In some embodiments, for example, the virtualized storage system 104 may detect that host-1 can no longer perform iSCSI I/O with the iSCSI targets that host-1 owns. In response, the virtualized storage system 104 may identify one or more new target owners for the iSCSI targets owned by host-1. The virtualized storage system 104 may publish to the data service 132 that a change has occurred. The data service 132 may notify (808) the host machines 102 in the virtualization system 100 of a change in ownership of a target. As explained in connection with FIG. 5, each host machine 102 including host-0 may learn (808a) of the new owner(s) of the iSCSI targets that were formerly owned by failed host-1.

When host-1 fails, the initiator 14 may experience (810) the occurrence of the failure, for example, by timing out while conducting iSCSI I/O with host-1. The initiator 14 may be configured with a multipath I/O (MPIO) framework for high availability connectivity with storage systems, and attempt to establish a connection with a new target owner in response to the failure. The initiator 14 may repeat (812) the discovery operation with host-0 to identify the (new) target owner. Host-0 may return (814) information that identifies the new target owner (e.g., alternate host machine, host-2) of the given iSCSI target, thus re-directing initiator 14 to host-2. After a login sequence with host-2, the initiator 14 may perform (816) iSCSI-based I/O with host-2, which may include host-2 communicating (816a, 816b) VS I/F commands/protocols with host machines 102 (e.g., host-A, host-B), whose hard disk drives 122 comprise the target LUN in the given iSCSI target, to access data from those hard disk drives as explained above.

Figure 9:
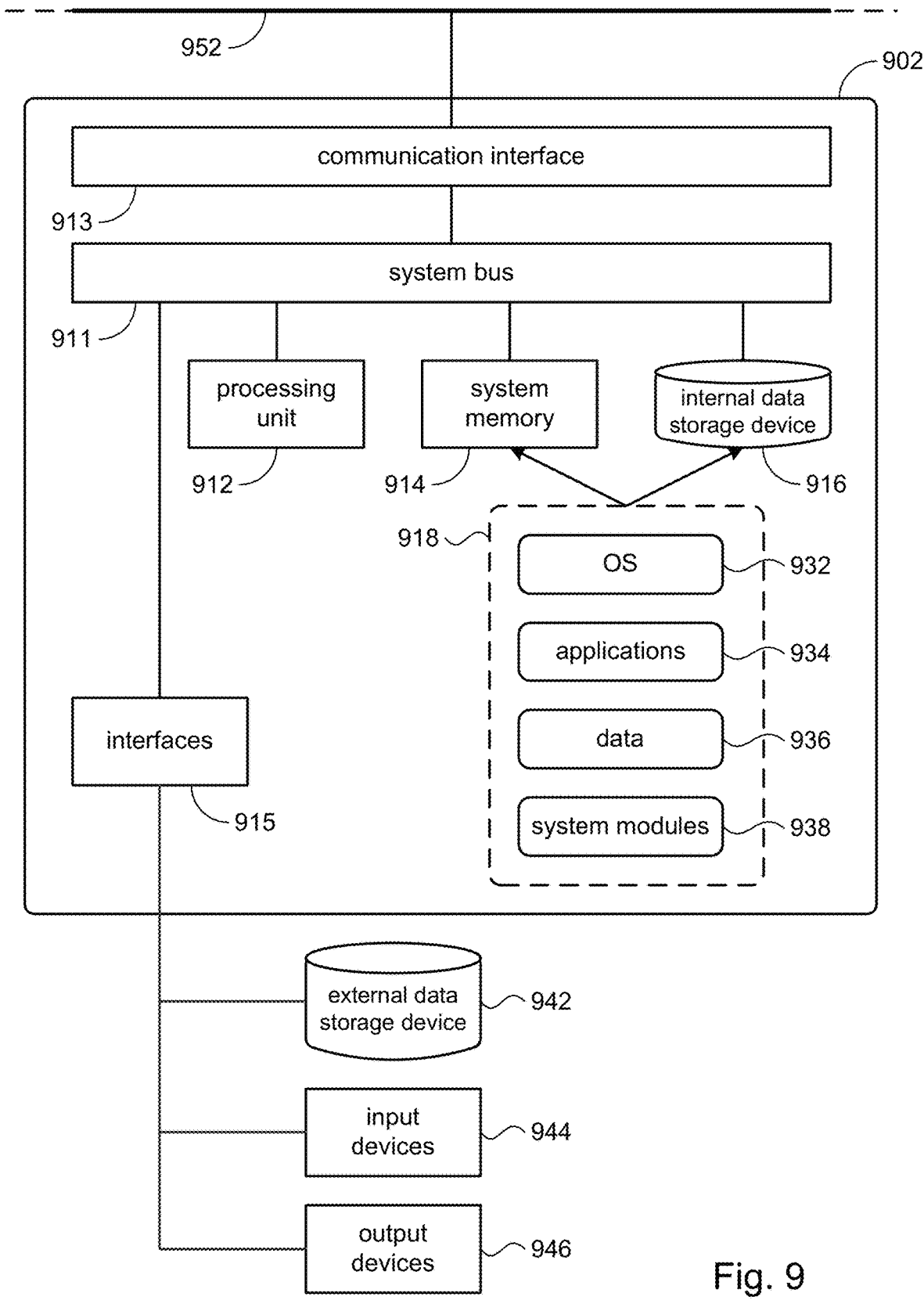
FIG. 9 shows an illustrative example of hardware details for a host machine in accordance with the present disclosure.

Referring to FIG. 9, an illustrative implementation of a host machine 102 may include a computer system (computer device) 902 having a processing unit 912, a system memory 914, and a system bus 911. The system bus 911 may connect various system components including, but not limited to, the processing unit 912, the system memory 914, an internal data storage device 916, and a communication interface 913. The communication interface 913 may include network communication ports (e.g., for communication over TC/IP).

The processing unit 912 may comprise a single-processor configuration, or may be a multi-processor architecture. The system memory 914 may include read-only memory (ROM) and random access memory (RAM). The internal data storage device 916 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 916 and its associated non-transitory computer-readable storage media may provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 914 and/or the internal data storage device 916 may store various program and data modules 918, including for example, operating system 932, one or more programs 934, program data 936, and other program/system modules 938. For example, in a computer system 902 configured as a host machine 102 in the virtualization system 100, the programs 934, which when executed, may cause the computer system 902 to perform method steps of FIGS. 4 and 7.

An external data storage device 942 may be connected to the computer system 902. In some embodiments, for example the data storage device 942 may constitute datastore 532 (FIG. 5) for data service 132. In some embodiments, external data storage device 942 may store the configuration file 134.

Access to the computer system 902 may be provided by a suitable input device 944 (e.g., keyboard, mouse, touch pad, etc.) and a suitable output device 946, (e.g., display screen). The input and output devices 944, 946 may provide administrative access; e.g., access to host daemon 344.

The computer system 902 may operate in a networked environment using logical connections via wired and/or wireless communications to one or more remote computers (not shown) over a communication network 952. The communication network 952 may be a local area network (LAN) and/or larger networks, such as a wide area network (WAN).

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a virtualization system comprising a plurality of host machines and a distributed storage system, each host machine hosting a plurality of virtual machines, the method comprising:
   a given host machine among the plurality of host machines receiving an inbound internet small computer systems interface (iSCSI) protocol packet from a computer system that is not part of the virtualization system, the inbound iSCSI protocol packet identifying a logical storage device defined in the distributed storage system, the logical storage device comprising storage allocated from first physical storage directly accessible only via a first host machine in the plurality of host machines and at least second physical storage directly accessible only via a second host machine in the plurality of host machines;
   the given host machine accessing a small computer systems interface (SCSI) command encapsulated in the inbound iSCSI protocol packet;
   the given host machine forwarding input/output (I/O) operations to both the first and second host machines to perform I/O in accordance with the SCSI command;
   the given host machine receiving return data from both the first and second host machines;
   the given host machine generating an outbound iSCSI protocol packet comprising the return data from both the first and second host machines; and the given host machine sending the outbound iSCSI protocol packet to the computer system.

2. The method of claim 1, wherein the method is performed by a hypervisor in the given host machine.

3. The method of claim 1, further comprising defining the logical storage device by allocating storage from two or more hard drives connected respectively to the first and second host machines.

4. The method of claim 1, further comprising, prior to the given host receiving the inbound iSCSI protocol packet, determining the given host is an owner of the logical storage device, including:
   an initial host machine among the plurality of host machines receiving a request to discover the owner of the logical storage device;
   the initial host machine determining that the owner of the logical storage device is the given host machine; and
   the initial host machine sending to the computer system data associated with the given host machine that identifies the given host machine,
   wherein the computer system uses the data associated with the given host machine to communicate iSCSI protocol packets with the given host machine to perform I/O on the logical storage device.

5. The method of claim 4, wherein the initial host machine is any one of the plurality of host machines that comprise the virtualization system.

6. The method of claim 4, wherein the initial host machine and the given host machine are the same host machine.

7. The method of claim 1, further comprising redirecting requests from the computer system to an alternate host machine that is selected from the plurality of host machines of the virtualization system to perform I/O on the logical storage device, including:
   sending data associated with the alternate host machine to the computer system that identifies the alternate host machine;
   the alternate host machine receiving subsequent iSCSI protocol packets from the computer system; and
   the alternate host machine performing I/O on the logical storage device.

8. The method of claim 7, wherein the redirecting is performed in response to detection of a failure in the given host machine.

9. The method of claim 7, wherein the redirecting is performed in response to detection of dividing the plurality of host machines that comprise the virtualization system into separate networks.

10. The method of claim 1, further comprising receiving the inbound iSCSI protocol packet at a network interface port of the given host machine and sending the outbound iSCSI protocol packet at the network interface port of the given host machine.

11. The method of claim 1, wherein the first host machine is the given host machine.

12. The method of claim 1, wherein the first host machine and the second host machine are different from the given host machine.

13. A non-transitory computer-readable storage medium having stored thereon computer executable instructions which, when executed by a computer device in a given host machine among a plurality of host machines in a virtualization system that comprises the plurality of host machines and a distributed storage system, cause the computer device to:
   receive an inbound internet small computer systems interface (iSCSI) protocol packet from a computer system that is not part of the virtualization system, that identifies a logical storage device defined in the distributed storage system, the logical storage device comprising storage allocated from first physical storage directly accessible only via a first host machine in the plurality of host machines and at least second physical storage directly accessible only via a second host machine in the plurality of host machine;
   access a small computer systems interface (SCSI) command encapsulated in the inbound iSCSI protocol packet;
   forward input/output (I/O) operations to both the first and second host machines to perform I/O in accordance with the SCSI command;
   receive return data from both the first and second host machines in response to performing the I/O;
   generate an outbound iSCSI protocol packet comprising the return data from both the first and second host machines; and
   send the outbound iSCSI protocol packet to the computer system.

14. The non-transitory computer-readable storage medium of claim 13, wherein the computer executable instructions, which when executed by a computer device, further cause the computer device to define the logical storage device by allocating storage from two or more hard drives connected respectively to the first and second host machines.

15. The non-transitory computer-readable storage medium of claim 13, wherein the computer executable instructions, which when executed by a computer device, further cause the computer device to redirect requests from the computer system to an alternate host machine that is selected from the plurality of host machines of the virtualization system to perform I/O on the logical storage device, including:
   sending data associated with the alternate host machine to the computer system that identifies the alternate host machine;
   the alternate host machine receiving subsequent iSCSI protocol packets from the computer system; and
   the alternate host machine performing I/O on the logical storage device.

16. The non-transitory computer-readable storage medium of claim 13, wherein the first host machine is the given host machine.

17. The non-transitory computer-readable storage medium of claim 13, wherein the first host machine and the second host machine are different from the given host machine.

18. A host machine among a plurality of host machines in a virtualization system that comprises the plurality of host machines and a distributed storage system, the host machine comprising:
   one or more computer processors;
   a virtual distributed storage system; and
   a computer-readable storage medium comprising instructions for controlling the one or more computer processors to:
   receive an inbound internet small computer systems interface (iSCSI) protocol packet from a computer system that is not part of the virtualization system, that identifies a logical storage device defined in the distributed storage system, the logical storage device comprising storage allocated from first physical storage directly accessible only via a first host machine in the plurality of host machines and at least second physical storage directly accessible only via a second host machine in the plurality of host machine;

access a small computer systems interface (SCSI) command encapsulated in the inbound iSCSI protocol packet;

forward input/output (I/O) operations to both the first and second host machines to perform I/O in accordance with the SCSI command;

receive return data from both the first and second host machines in response to performing the I/O;

generate an outbound iSCSI protocol packet comprising the return data from both the first and second host machines; and send the outbound iSCSI protocol packet to the computer system.

19. The host machine of claim 18, further comprising receiving the inbound iSCSI protocol packet at a network interface port of the host machine and sending the outbound iSCSI protocol packet at the network interface port of the host machine.

20. The host machine of claim 18, wherein the first host machine and the second host machine are different from the host machine.

* * * * *